(12) United States Patent
Klein et al.

(10) Patent No.: US 11,856,900 B2
(45) Date of Patent: Jan. 2, 2024

(54) SELECTIVE APPLICATION OF CONSUMABLES VIA IRRIGATION SYSTEMS

(71) Applicant: RACHIO, INC., Denver, CO (US)

(72) Inventors: Christopher M. Klein, Denver, CO (US); Emil Motycka, Denver, CO (US); Simon Hill, Centennial, CO (US); Franz David Garsombke, Golden, CO (US)

(73) Assignee: RACHIO, INC., Denver, CO (US)

( * ) Notice: Subject to any disclaimer, the term of this patent is extended or adjusted under 35 U.S.C. 154(b) by 0 days.

(21) Appl. No.: 17/399,921

(22) Filed: Aug. 11, 2021

(65) Prior Publication Data

US 2022/0046871 A1 Feb. 17, 2022

Related U.S. Application Data

(60) Provisional application No. 63/064,559, filed on Aug. 12, 2020.

(51) Int. Cl.
*A01G 25/16* (2006.01)
*G05B 19/042* (2006.01)

(52) U.S. Cl.
CPC ......... *A01G 25/167* (2013.01); *G05B 19/042* (2013.01); *G05B 2219/2625* (2013.01)

(58) Field of Classification Search
CPC ............... A01G 25/167; G05B 19/042; G05B 2219/2625
See application file for complete search history.

(56) References Cited

U.S. PATENT DOCUMENTS

| | | | | |
|---|---|---|---|---|
| 4,995,418 A | * | 2/1991 | Cervola | A01C 23/042 422/282 |
| 7,083,118 B1 | * | 8/2006 | Bowles | A01C 23/042 137/98 |
| 7,093,606 B2 | * | 8/2006 | Roberts | A01C 23/042 222/386.5 |
| 8,215,570 B2 | | 7/2012 | Hitt | |
| 9,565,810 B2 | | 2/2017 | Eng et al. | |
| 9,594,366 B2 | | 3/2017 | Klein et al. | |
| 10,015,938 B1 | | 7/2018 | Malsam et al. | |
| 10,124,358 B1 | | 11/2018 | Graham et al. | |
| 10,271,474 B1 | * | 4/2019 | Miller | A01G 25/06 |
| 10,402,835 B2 | * | 9/2019 | Benkert | G06Q 30/0201 |
| 2004/0052155 A1 | * | 3/2004 | Fabries | A01C 23/042 366/163.2 |
| 2009/0281672 A1 | | 11/2009 | Pourzia | |

(Continued)

FOREIGN PATENT DOCUMENTS

IN 201721018321 A 9/2017
WO 9708942 A1 3/1997

*Primary Examiner* — Chad G Erdman
(74) *Attorney, Agent, or Firm* — Dorsey & Whitney LLP

(57) ABSTRACT

A method of delivering a consumable to an irrigation area may include determining application characteristics for applying the consumable to the irrigation area based on irrigation area characteristics of the irrigation area, generating an irrigation schedule for the irrigation area based on consumable characteristics of the consumable and the application characteristics, and transmitting the irrigation schedule to a local control to selectively activate one or more water outlets to the irrigation area based on the irrigation schedule.

20 Claims, 6 Drawing Sheets

(56) References Cited

U.S. PATENT DOCUMENTS

| | | | |
|---|---|---|---|
| 2016/0255771 A1* | 9/2016 | Moras ................. | A01C 23/042 |
| 2017/0238484 A1* | 8/2017 | Arumugam .......... | G06V 20/188 |
| 2020/0037520 A1 | 2/2020 | Motycka et al. | |
| 2020/0151376 A1* | 5/2020 | Gates .................. | A01G 25/167 |

\* cited by examiner

SELECTIVE APPLICATION OF CONSUMABLES VIA IRRIGATION SYSTEMS

CROSS-REFERENCE TO RELATED APPLICATION

The present application claims priority under 35 U.S.C. § 119 to U.S. Provisional Application No. 63/064,559 entitled "Selective Application of Consumables via Irrigation Systems," filed on Aug. 12, 2020, which is hereby incorporated by reference herein in its entirety.

FIELD

The present disclosure relates generally to irrigation and nutrient delivery for vegetation, such as grass or the like in residential areas.

BACKGROUND

Many home owners have vegetation, such as grass, vegetable gardens, trees, flowers, etc., that receive water via an irrigation system. Irrigation systems may generally include a controller and a number of delivery outlets, such as sprinkler heads, drip lines, and the like. Conventional irrigation systems are able to deliver water from a single source to the delivery outlets. If home owners wish to apply other materials, such as fertilizers, nutrients, biostimulants, or the like, these materials are applied separately and through a different manner, e.g., hand or direct application to the vegetation.

Irrigation systems generally receive water from a water line and in some instances may include a backflow preventer or anti-siphon that helps to prevent potable water in the water line from being contaminated with non-potable water within the irrigation lines during a backflow condition. In systems with such devices, the devices are placed downstream of the connection to the water line and upstream of the delivery outlets, e.g., between the irrigation system and the main water line.

SUMMARY

In one embodiment, a method of applying a consumable to an irrigation area is disclosed. The method includes analyzing area characteristics of the irrigation area to determine an application time, generating a watering schedule based on the application time and consumable characteristics, and transmitting the watering schedule to a local control to selectively activate one or more delivery outlets on the irrigation area based on the watering schedule.

In another embodiment, a system for application of nutrients to an area is disclosed. The system includes a central controller, a local controller in electronic communication with the central controller, and a nutrient module in fluid communication with a sprinkler system controlled by the local controller.

In yet another embodiment a method of associating irrigation components with a user account is disclosed. The method includes receiving from a user device an image including a component identifier, analyzing the received component identifier relative to a database, and associating the component identifier with a user account.

Another method of delivering a consumable to an irrigation area may include determining application characteristics for applying the consumable to the irrigation area based on irrigation area characteristics of the irrigation area, generating an irrigation schedule for the irrigation area based on consumable characteristics of the consumable and the application characteristics, and transmitting the irrigation schedule to a local control to selectively activate one or more water outlets to the irrigation area based on the irrigation schedule.

An example system for application of nutrients to an area may include a central controller configured to generation an irrigation schedule for delivery of a consumable to an irrigation area and a nutrient module in fluid connection with a sprinkler system, where the nutrient module includes the consumable. A local controller in electronic communication with the central controller may be configured to selectively activate the sprinkler system in accordance with the irrigation schedule to deliver the consumable to the irrigation area.

Example non-transitory computer readable media may be encoded with instructions which, when executed by one or more processors of a central controller, cause the central controller to determine application characteristics for applying a consumable to an irrigation area based on irrigation characteristics of the irrigation area, generate an irrigation schedule for the irrigation area based on consumable characteristics of the consumable and the application characteristics, and transmit the irrigation schedule to a local control to selectively activate one or more water outlets to the irrigation area based on the irrigation schedule.

DETAILED DESCRIPTION

Figure 1A:
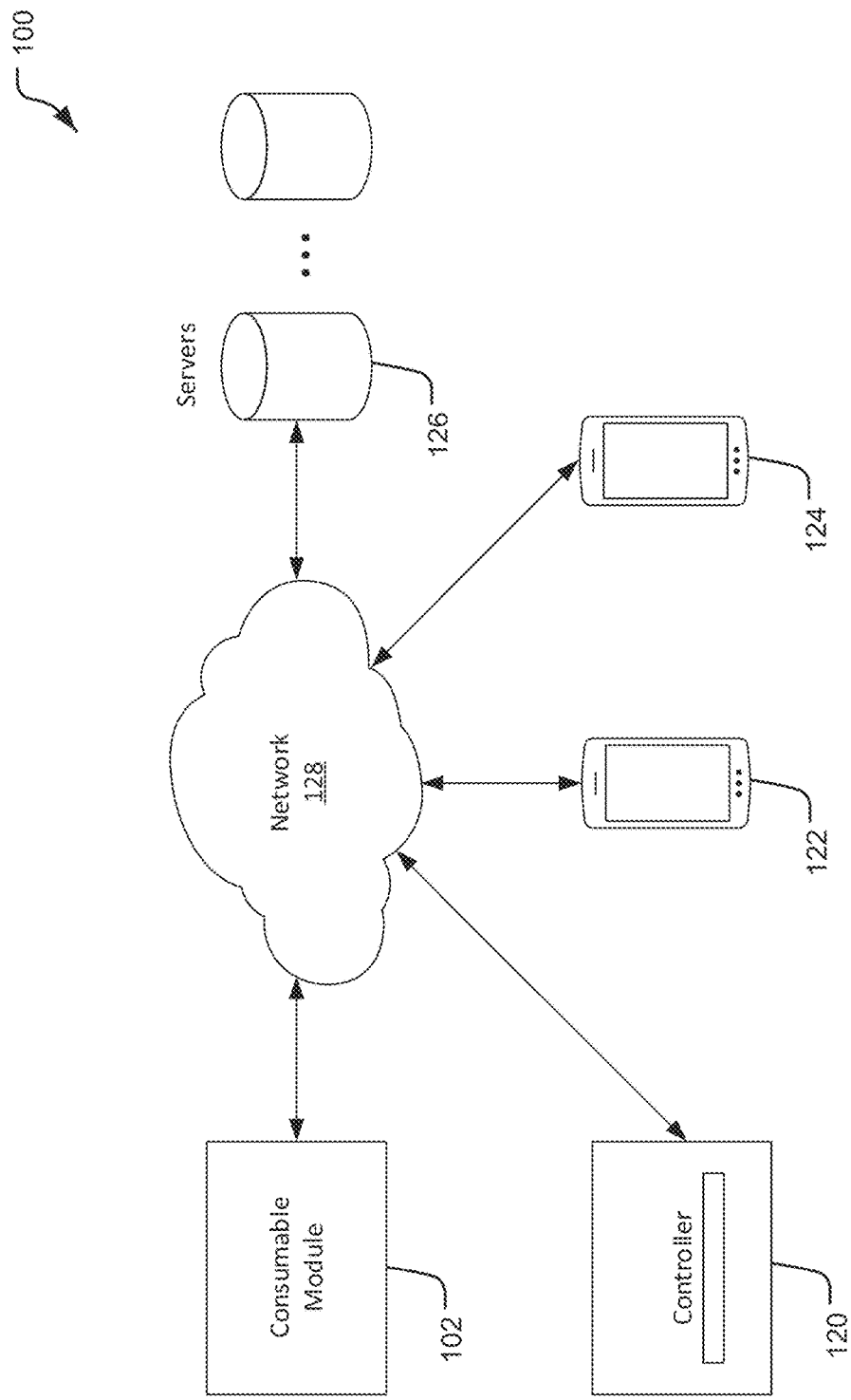
FIG. 1A is a schematic of an irrigating system for delivery of consumables to irrigated areas.

The present disclosure relates generally to a system and method to allow automatic identification and application of consumables (e.g., nutrients, fertilizers, stimulants, etc.) to an irrigated area utilizing the irrigation system. In some embodiments, elements of the system are fluidly connected to the irrigation system around or at a backflow prevention location, allowing easier installation and connection to a water supply system. In other examples, features of the system may include an integrated backflow valve that helps to prevent backflow into the system regardless of positioning, allowing more flexibility in the positioning of the features within the fluid system.

In one example, a consumable or nutrient delivery system includes an irrigation or water controller and a consumable module. The consumable module receives consumables, such as cartridges, packets, liquids, powders, gels, or the like, which may be inserted directly into the consumable module (e.g., loose) or within a packaging or filter (e.g., dissolvable wrapper, porous container) and is fluidly connected to the irrigation system and in electronic communication with the irrigation controller. The consumable module may include a module identifier that can be associated with the irrigation controller, such that a central controller (e.g., cloud based controller or cloud based server) that can generate watering schedules for the irrigation controller based on the characteristics of the consumable module. For example, at installation, a user may provide the module identifier, such as in the form of a scan or picture, to the central controller, which then associates the irrigator controller and the consumable module together. Similarly, as consumables are inserted or otherwise received by the consumable module, the user may provide the consumable data to the central controller, such as by taking a picture of the label or scanning a label on the consumable, or directly inputting the information (e.g., serial number) into a webpage or application associated with the controller.

Using the consumable characteristics and the module identifier, as well as vegetation and irrigation characteristics of the area, the central controller generates one or more consumable delivery schedules configured to selectively deliver the consumable. Vegetation characteristics may include, for example, the type or types of vegetation in the area, growth stage of the vegetation, and the like. Vegetation characteristics may be obtained, in various examples, from a homeowner, landscaper, or other end user. The characteristics may be supplied through filling out initial information about the vegetation area manually, scanning or inputting codes (e.g., QR codes) for seeds or plants when planted, and the like. Some vegetation characteristics may be derived by the central controller (or other application in communication with the central controller) based on other vegetation characteristics or information provided to the central controller.

For example, the central controller may create or maintain a growth model for the vegetation of the area, which may be based on types of vegetation, growth stage of the vegetation, area weather, watering schedules, other maintenance (e.g., cutting grass), and the like. The growth model may then be used by the central controller to derive or look up vegetation characteristics. The information used to generate such a model may be provided by a homeowner (e.g., through a mobile application or website), provided or updated by another entity such as a landscaping company, or derived from other data sources. For example, weather information may be obtained from public weather data and/or from data collection systems in the area (e.g., weather stations or rain gauges). The model may be updated by the central controller to reflect application of consumables, watering the area in accordance with watering schedules created by the central controller, updated weather data, and the like.

For example, the consumable may be a first volume and be specific to grass vegetation. In this example, the irrigation controller may activate the grass specific zones (e.g., zones 1 and zones 3), rather than all zones, with an activation time corresponding to the time needed to fully deplete the consumable volume. This helps to ensure that the consumable is delivered to the desired areas only, reducing waste, as well as helping to ensure that the full cartridge of the consumable is emptied before, also reducing waste. Further, the consumable is not applied to zones where it may be unhelpful or harmful to the vegetation in the zone. For example, a grass specific consumable may not be applied to zones including other plants that would not benefit from (or be harmed by) a grass specific consumable. In some examples, a consumable intended for a specific growth stage of vegetation (e.g., intended to supplement for early stage growth) may not be applied to zones with vegetation in different stages of growth.

The system may also select the consumable delivery schedule or activation of the delivery schedule based on vegetation, irrigation, and area characteristics. For example, the central controller may monitor a moisture content value for the vegetation and when a desired moisture content range is reached that will maximize or otherwise improve absorption of the consumable, the system may then activate the delivery schedule. The moisture content value may, in various examples, be derived from known water volume previously delivered by the irrigation system, weather data, and known characteristics of the vegetation. For example, the central controller may use the growth model for the vegetation to monitor moisture content. In this manner, the consumable maybe further conserved as the application will be activated within preferred conditions, preventing or reducing run off and increasing absorption.

Similarly, the system may also track the consumable delivery schedule and activation and use the consumable application data to improve or provide feedback to other irrigation schedules, such as watering schedules. For example, the consumable information may allow better or more growth curve estimates, which can then be used by the system to vary watering times. The system may generate irrigation schedules for use with a permanent irrigation system (e.g., permanent in-ground sprinklers) and/or for temporary or other types of watering systems, such as sprinklers connected to a hose bib for water delivery. In some examples, the system may generate irrigation schedules for in-ground or permanent irrigation systems with additional temporary water outlets (e.g., sprinklers) added to provide additional irrigation to the area irrigated by the permanent irrigation system.

Figure 1B:
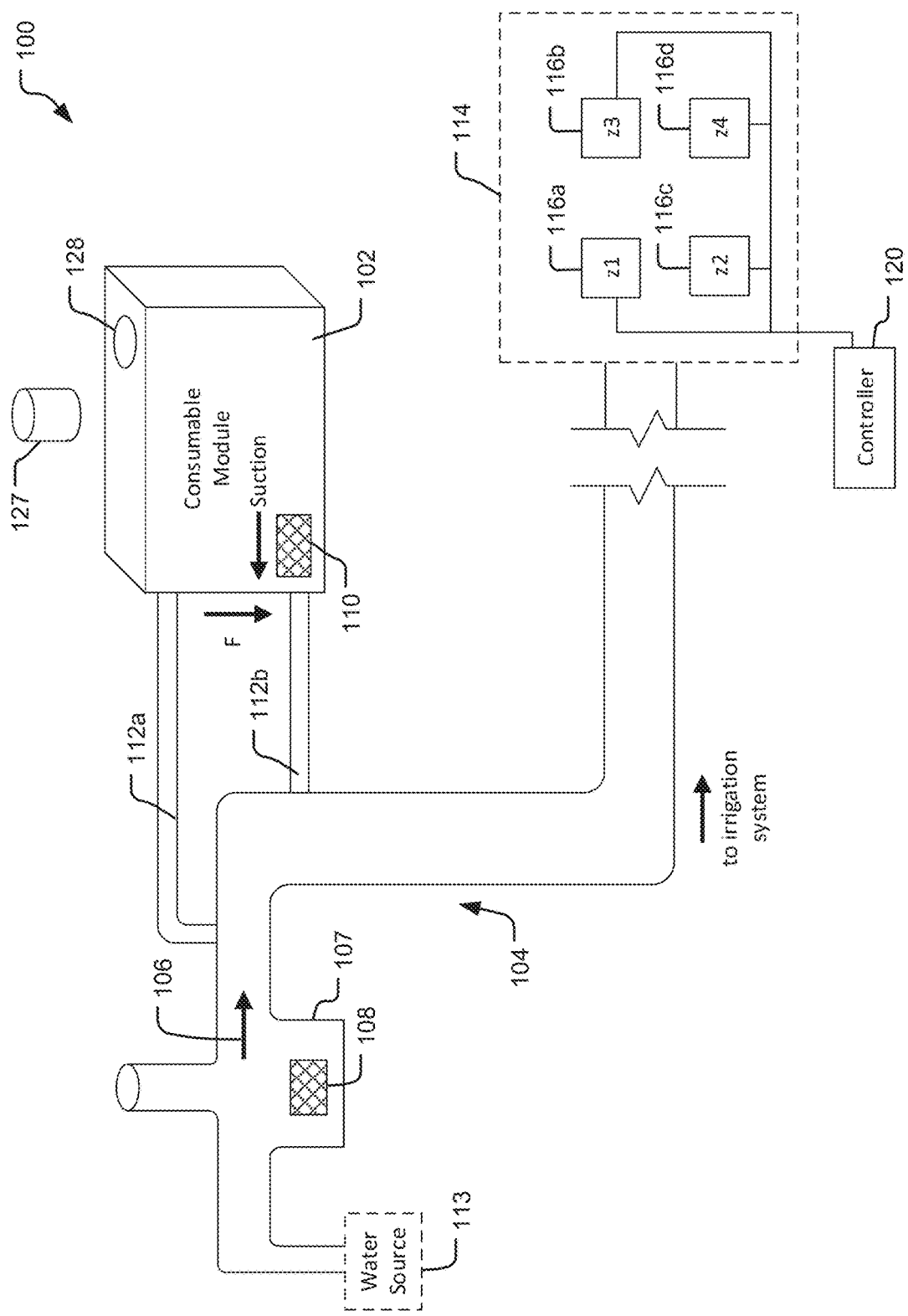
FIG. 1B is a block diagram of the select system components of FIG. 1A connected to a water supply system for an irrigated area.

Turning to the figures, a consumable delivery system 100 will be discussed in more detail. FIG. 1A illustrates the consumable delivery system 100 including a consumable module or applicator 102, a controller 120, one or more user devices 122, 124, one or more servers 126, all of which may be in communication via one or more networks 128. FIG. 1B illustrates a schematic connection of the irrigation system 100 at a particular location, such as a watering area or the like, e.g., a residence, business, or the like, where the irrigation system 100 provides irrigation and consumables to an irrigated area 114. The irrigated area 114 typically is fluidly connected to a water supply system 104, which may include a water source 113 (e.g., main water line connected to a utility), an irrigation delivery pathway 106, and in some instances may include a back flow prevention assembly 107, such as one or more valves, that act to prevent water from the delivery pathway 106 from backing into or re-entering into the water source 113. In some embodiments, the back flow prevention assembly 107 may be replaceable and may include an identifier 108. The preventer identifier 108 may be a QR code, barcode, serial number, image, or other type of content or icon that can be used to identify the prevention assembly 107. In some examples, back flow prevention may be included in the consumable module 102, which may be in addition to or in place of the back flow prevention assembly 107. For example, the consumable module 102 may include a back flow or one way valve to allow for positioning the consumable module 102 at different locations within the irrigation system 100, such as closer to an outdoor water source (e.g., close to or coupled with a hose bib).

The irrigated area 114 may be divided or separated into one or more irrigation zones 116a, 116b, 116c, 116d that may be activated separately or jointly. The zones 116a, 116b, 116c, 116d generally include one or more delivery outlet sources, such as sprinkler heads, irrigation drip lines, soak lines, drip nozzles, and the like, and when activated, the delivery outlets are fluidly connected to a main water source 113 to deliver water. Delivery outlets may include, for example, in-ground sprinkler heads, removable outlets (e.g., sprinkler heads and/or nozzles connected to a hose bib), sprayers, drip lines, and the like. Accordingly, a zone may be an in-ground zone or may correspond to the area irrigated by an above ground outlet, such as a hose sprinkler, nozzle, sprayer, etc. Depending on the landscape and vegetation of the irrigated area 114, the zones 116a, 116b, 116c, 116d may correspond to different types of vegetation, e.g., grass, vegetable garden, natural landscaping, flower beds, trees, and so on. As such, individual and separate watering schedules for activating the zones 116a, 116b, 116c, 116d are helpful to ensure that the vegetation in a particular zone receives a correct volume of water.

The controller 120 may be an irrigation or sprinkler controller 120 electronically connected to one or more activators (e.g., activation valves) that control fluid pathways to one or more delivery outlets, such as sprinkler heads, irrigation drip lines, and the like. For example, the controller 120 may be a controller coupled to a hose, e.g., positioned between a hose bib and a hose, and configured to control a sprinkler head or other delivery outlet connected to the hose. In some instances, each zone 116a, 116b, 116c, 116d may have its own activator, allowing the controller 120 to selectively activate the zones separately from one another. The controller 120 may be a smart controller and connected to the one or more servers 126 (e.g., through the network 128) that act as a "central" controller that generates watering schedules for the controller 120 based on vegetation characteristics, weather patterns, and the like. In some instances the controller 120 is assigned to a particular user, such as a user account, that identifies the irrigation area 114, as well as user characteristics.

An example of the controller 120 may be found in U.S. Pat. No. 9,594,366 entitled "System and Method for an Improved Sprinkler Controller System," filed on May 6, 2014, and/or U.S. patent application Ser. No. 16/528,070 entitled Method for Dynamically Increasing Plant Root Depth, filed on Jul. 31, 2019, both of which are hereby incorporated by reference in their entireties for all purposes. As shown in FIG. 1B, the controller 120 may be electrically connected to the zone actuators, such as solenoid vales or other actuators, to selectively fluidly connect one or more delivery outlets in one or more watering zones 116a, 116b, 116c, 116d to the main water source 113 via the one or more flow pathways 106.

With reference to FIG. 1B, the consumable module 102 may be a container or other vessel fluidly connected to the water supply system 104, such as connected to the flow pathway 106, e.g., via module inlet pathway 112a and module outlet pathway 112b. The consumable module 102 houses one or more nutrient cartridges or nutrient supplies, such as a nutrient cartridge 127. For example, the consumable module 102 may define an internal cavity 128, holding area, tank, or compartment configured to receive the consumable or nutrient cartridge 127 therein. In some examples, the internal cavity 128 may be configured to receive the consumable without a cartridge or other container. The consumable module 102 may also include an identifier, such as a QR code, barcode, image, serial number, or the like, that may be used to electronically identify the consumable module 102. In some instances, the module identifier 110 may be defined, attached, or otherwise positioned on an outer surface of the module 110 or within an easy to access area (e.g., beneath a lid or cover).

The consumable module 102 is fluidly connected to the flow pathway 106, such that fluid flows into the consumable module 102 via the inlet pathway 112a and out the consumable module 102 via the outlet pathway 112b. The consumable module 102 may be located, as shown in FIG. 1B, between a water source 113 and the controller 120. In some examples, the consumable module 102 may be located between the controller 120 and fluid outlets (e.g., sprinkler heads) controlled by the controller 120.

The consumable or nutrient cavity 128 and cartridge 127 are configured to be positioned within an internal module fluid path, such that as fluid flows into the module 102, the fluid is exposed to and able to mix or carry the nutrients within the cartridge 127 out of the module. In some examples, the cartridge 127 may be emptied into the cavity 128 to deposit the consumable or nutrients into the cavity 128. In some examples, the cartridge 127 may be placed into the nutrient cavity 128 and may act as a porous filter or may dissolve when fluid is mixed into the nutrient cavity 128. For example, the consumable module 102 may include varying inlet and outlet diameters to manipulate pressures and velocity, e.g., defining a venturi, to create a vacuum type effect, drawing nutrients from the nutrient cartridge 127 into the flow path. As shown by the F and S arrows in FIG. 1B, as the water travels from the inlet to the outlet, the pressure differential between the two 112a, 112b pathways, acts to pull the nutrients in the S direction, mixing with the flow, and then output back into the main flow pathway 106 from the outlet pathway 112b. In this manner, the consumable module 102 may define a venturi injector to inject the nutrients into the flow pathway 106, where the injection may depend on fluid flowing through the flow pathway 106.

In other embodiments, other types of injection or mixing mechanics can be used, e.g., a fluid pump, turbine, or the like, which may or may not be powered (e.g., via battery or solar power). Additionally, in some instances, the consumable module 102 may include valves positioned between the flow pathway 106 and the inlet pathway 112a and/or outlet pathway 112b (or between inlets/outlets within the module 102). These valves may be pressure or electronically controlled to control flow and intermixing of the water with the consumable. It should also be noted that the consumable module 102 may include one or more onboard sensors, processors, and the like, that may be used to detect water temperature, flow rates, nutrient levels within the cartridge 127, and so on.

The user devices 122, 124 may be substantially any type of computing device, such as, but not limited to, smart phone, tablet, laptop, personal computer, or the like, that may be used to allow a user to view information and control the irrigation system 100. For example, the user devices 122, 124 may include an irrigation application (app) that may be associated with a user account and the irrigation area 114. In some instances, the first user device 122 may be an irrigation owner device, such as a home owner device, and the second user device 124 may be associated with an irrigation service provider, such as a landscaper.

The servers 126 may define the central controller and are one or more processing elements that are interconnected together, e.g., physically and/or electronically, to execute and receive instructions. The servers may be a cloud based computing platform, virtual server network, or the like.

Various components of the irrigation system 100 may be in electronic communication with one another via one or more networks 128. The networks 128 may be any type of data transmission platform, such as wired or wireless communication systems and may include one or more combination of networks, such as local area networks, wide area networks, and the like. Examples of the network 128 includes LoRa, Bluetooth, Wi-Fi, and so on. In one example, the consumable module 102 may be in electronic communication with the controller 120 via a local area network or a LoRa network and the controller 120 may in turn be in communication with the servers 126 via the Internet. In this manner, then consumable module 102 may be connected to the central controller 126 through the controller 120. In this example, the consumable module 102 may include less powerful and expensive processing and compute hardware components, relying instead on the controller 120. In other embodiments, the consumable module 102 may act as a standalone device and may directly communicate with the central controller 126.

Figure 2:
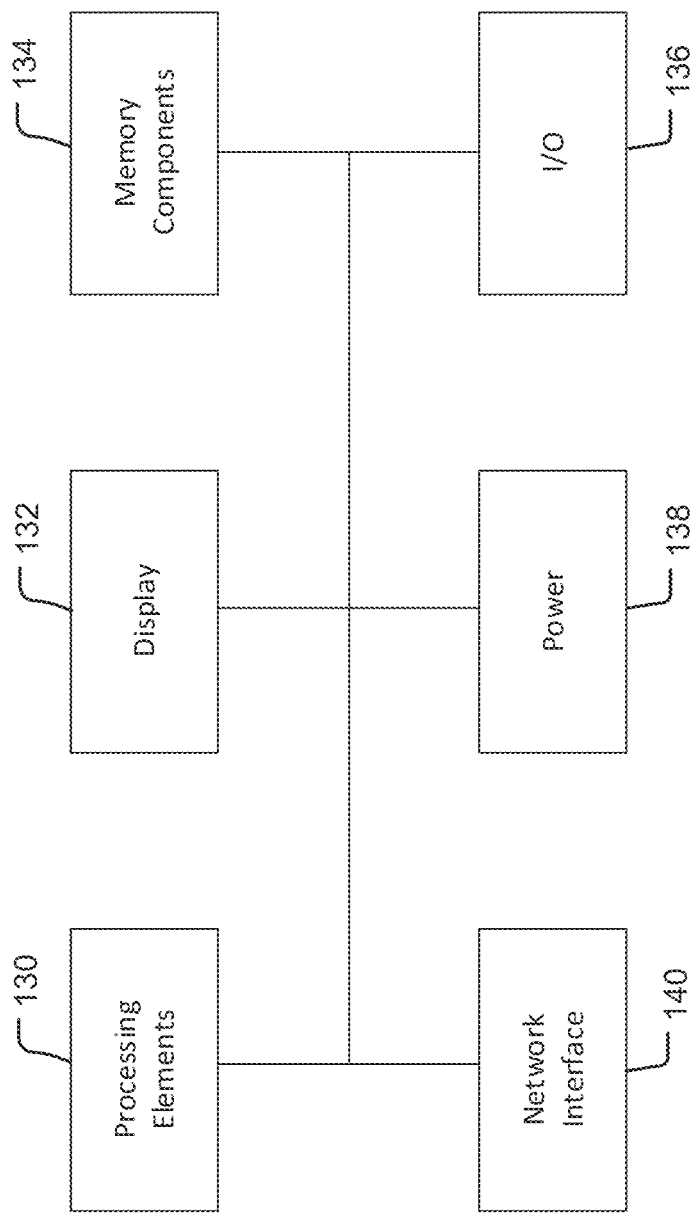
FIG. 2 is a simplified block diagram of computing devices included within the system of FIG. 1A.

FIG. 2 illustrates a simplified block diagram of a computing device, such as the consumable module 102, controller 120, user devices 122, 124, and/or servers 126. The computing devices may include one or more of one or more processing elements 130, an input/output interface 140, a power source 138, one or more memory components 134, and optionally a display 132, each of which may be in communication with one another such as through one or more system buses, wireless means, traces, or the like.

The one or more processing elements 130 are electronic devices capable of processing, receiving, and/or transmitting instructions and data. The processing elements 130 may be a microprocessor, processor, microcomputer, graphical processing unit, or a combination of multiple processing elements. For example, a first processing element may control a first set of components of the computing device and the second processing element may control a second set of computing devices, where the first and second processing elements may or may not be in communication with one another. Additionally the processing elements may be configured to execute one or more instructions in parallel.

The input/output interface 140 receives and transmits data to and from the network 128. The input/output interface 140 may transmit and send data to the network 108, as well as other computing devices.

The power 138 provides power to various components of the computing device. The power 138 may include one or more rechargeable, disposable, or hardwire sources, e.g., batteries, power cords, solar panels, or the like.

The memory 134 stores electronic data that may be utilized by the computing devices. The memory 134 may include electrical data or content, such as processor instructions (software code), audio files, video files, document files, and the like. The memory 134 may include multiple components, such as, but not limited to, non-volatile storage, a magnetic storage medium, optical storage medium, magneto-optical storage medium, read only memory, random access memory, erasable programmable memory, flash memory, or a combination of one or more types of memory components. In many embodiments, the server 126 may have a larger memory capacity than the user devices 122, 124 and/or local controller 120.

In some instances, the computing devices, such as the user devices 122, 124, may include a display 132. The display 132 provides a visual output for the computing devices and may be varied as needed based on the device. The display 132 may include a liquid crystal display screen, light emitting diode screen, plasma screen, and the like.

Figure 3:
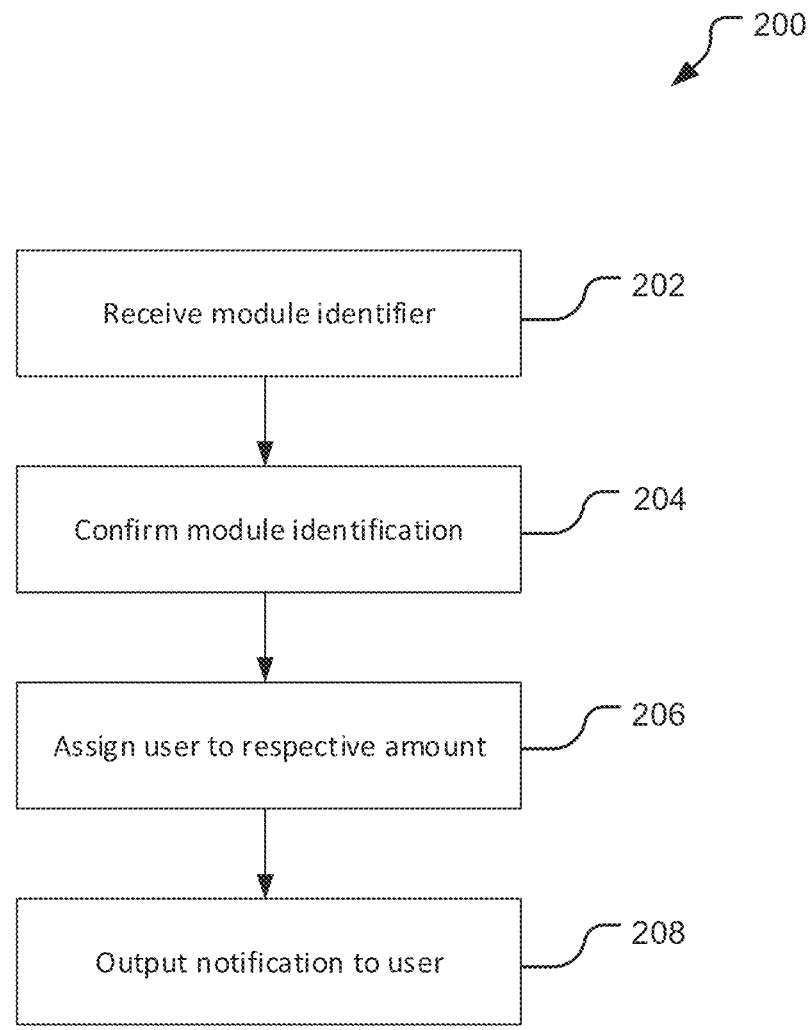
FIG. 3 is a flow chart illustrating a method to associate irrigating and consumable components with an irrigation area and/or user.

FIG. 3 illustrates a flow chart for a method 200 to correlate select components of the irrigation system 100 to one or more users. The method 200 may begin with operation 202 and the central controller 126 may receive an irrigation component identifier. For example, the user device 122 may capture an image by utilizing an onboard camera of the preventer identifier 108 and/or the consumable module 120 identifier 110, and then transmit the identifier 108, 110 to the central controller 126 via the network 128. Depending on the type of identifiers 108, 110, the user may take an image, may directly input the data (e.g., type in a serial number), or otherwise detect the information. For example, the user device may decode information from an image of the identifiers 108, 110 (e.g., read a barcode, QR code, or convert text in the image to text) and transmit the decoded information to the central controller 126 via the network 128. In some examples, the user device 122 may send a raw image to the central controller 126 and the central controller 126 may decode the image to obtain the identifier.

The method 200 may then proceed to operation 204 and the central controller 126 may confirm the identifier. For example, the central controller 126 may compared the received identifiers 108, 110 with a database, table, or other source of information, to confirm that the information is correct and the respective irrigation component can be identified. For example, the central controller 126 may compare a received identifier with a table or database of known identifiers (e.g., provided by manufacturers) to confirm the identifier. In some examples, other sources of information may include cross-referencing customer orders and/or the user device 122. For example, the central controller 126 may send a push notification or other communication to the user device 122 asking the user to verify that the identified component is correct. Additionally, this operation may include determining select characteristics of the component, such as type, flow rates, configuration, etc.

When the component has been identified, the method 200 may proceed to operation 206 and the central controller 126 may assign the respective irrigation component 107, 102 to a user account and/or irrigation area 114. For example, the central controller 126 may utilize user information transmitted with the identifier (e.g., a user name, account number, address, location, etc.), to correlate the identified component with the user or account. For example, the identifier may be stored in a relational database correlated with the user or account identified by the information transmitted with the identifier. Once correlated together, the user account and/or irrigation area 114 may be linked with the respective irrigation component 102, 107, such that the central controller 126 may be able to incorporate features of the irrigation component into the watering scheduling and other functionality for the irrigation area 114. It should be noted that in some instances the component may be associated with two or more user accounts. For example, the component may be associated with a home owner account corresponding to the owner of the irrigation area 114, as well as a service provider account, such as a landscape or yard maintenance company or professional.

After the component is associated with one or more user accounts, the method 200 proceeds to operation 208 and an optional notification can be output to the user device 122, 124, such as via the app. As one example, a message that the irrigation component 102, 107 has been successfully linked may be transmitted to the user device. As another example, the app may display a schematic icon of the user's irrigation system 100 and the irrigation component 102, 107 may be represented as a corresponding icon in the graphical user interface. The notification may be varied depending on the user, e.g., the home owner may receive a first notification and the service provider may receive another type of notification.

The method 200 can be used to allow the central controller 126 to retrieve additional information regarding irrigation components that may be useful in generating irrigating schedules implemented by the local controller 120. Additionally, the method 200 can be utilized to assess performance and provide incentives, such as for service providers. As an example, back flow preventers are often replaced by service professionals as the valves may rupture or wear out over time. In these instances, the service providers could be incentivized to install identifiable preventers 107 (e.g., those with an identifier 108) at different customer homes. When installed, the method 200 could be used to associate the component with a user and determine that the component was installed by a select provider. The installing provider could then be provided with incentives (e.g., bonus, cash back, or the like), based on the number of installs.

Figure 4:
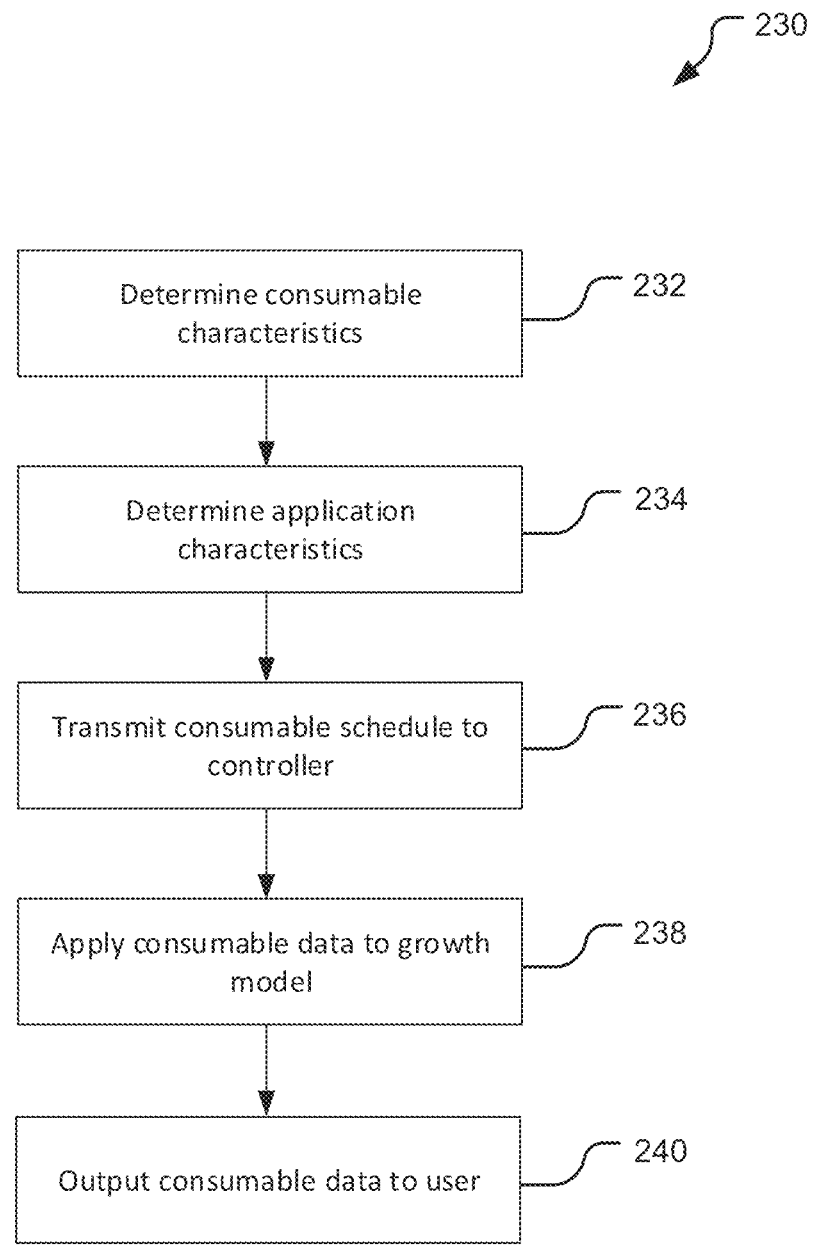
FIG. 4 is a flow chart illustrating a method of selectively applying consumables to an irrigation area.

FIG. 4 illustrates a method 230 of utilizing the irrigation system 100 to selectively deliver consumables, such as nutrients, fertilizers, organisms, biostimulants and the like, to the irrigated area 114. The method 230 begins with operation 232 and the consumable information for the irrigated area 114 is determined by the central controller 126. For example, the user device 122 may capture information about the consumable cartridge 127 before inserting into the consumable module 102 and transmit the information to the central controller 126. As another example, the central controller 126 may assist in arranging for delivery of select consumables to the user address and use the known information about the delivered consumables to determine the consumable characteristics. As another example, the user may directly enter information about consumables being inserted into the consumable module 102. Using the information received from the user, the central controller 126 may retrieve specific consumable characteristics, such as from a database or the like. Consumable characteristics may include type, chemical makeup, volume or amount received within the nutrient module 102, application frequency, targeted vegetation, and other information that can be used to determine how, where, and when the consumable should be delivered to selected locations within the irrigated area 114.

The method 230 proceeds to operation 234 and the application characteristics for the consumable are determined. For example, the central controller 126 may utilize the consumable characteristics, along with irrigation area characteristics (e.g., vegetation types by zone, watering schedule, weather, moisture content, use or traffic, expected growth, and the like), to determine application characteristics corresponding to delivery of the consumable. The central controller 126 may receive and/or derive irrigation area characteristics from user input. For example, vegetation information may be obtained, in various examples, from a homeowner, landscaper, or other end user. Such vegetation information may be supplied through filling out initial information about the vegetation area manually, scanning or inputting codes (e.g., QR codes) for seeds or plants when planted, providing photographs of the irrigation area, and the like. The central controller 126 may, in various implementations, estimate or derive additional information, such as moisture content and expected growth, from vegetation characteristics in combination with other data, such as local weather data, known watering schedules, and the like. In some examples, the central controller 126 may utilize a growth and irrigation model for the zones of the irrigation area in determining application characteristics for the consumable.

For example, the central controller 126 may determine that the consumable is a grass fertilizer and is designed for application on grass in the early growth stage. Using this information, along with known vegetation characteristics for the zones 116*a*, 116*b*, 116*c*, 116*d*, the central controller 126 can determine that the consumable should be applied to zones 116*a*, 116*b*, and not zones 116*c*, 116*d*. In this manner, the central controller 126 can then generate an irrigation schedule that activates the first two zones 116*a*, 116*b* and not the remaining two zones 116*c*, 116*d*, until all of the consumable has been delivered. As another example, the central controller 126 may use the volume or consumable amount information to determine the run time for the zones that will ensure full use of the consumable and that the consumable has been applied in its entirety to the irrigated area 114.

In some examples, the central controller 126 may generate user instructions along with the irrigation schedule to deliver the consumable to specific areas of the irrigation area 114. For example, where the controller 120 controls a movable water outlet (e.g., a sprinkler connected to a garden hose), the central controller 126 may determine a location for the movable sprinkler such that the desired area or zone receives the consumable. For example, where a consumable is formulated for growth of flowers and the user indicates that the sprinkler is located to water grass, the central controller 126 may send a notification to the user to move the sprinkler to the flowers in conjunction with generation of the irrigation schedule. In some examples, the central controller 126 may receive an initial location of the sprinkler through an image or other user input. The central controller 126 may transmit the updated location of the sprinkler through an image of the irrigation area showing the updated location, written instructions to move the sprinkler to a certain area or zone, and the like.

With reference to FIG. 4, once the application characteristics have been determined, and an irrigation schedule generated, the method 230 proceeds to operation 236 and the generated irrigation schedule is transmitted to the controller 120. For example, a separate consumable delivery irrigating schedule may be generated using the application characteristics, and the delivery schedule may be transmitted to the local controller 120 for execution by the watering system 104. In particular, once the controller 120 receives the delivery schedule, the controller 120 may actuate select delivery outlets corresponding to the desired zones in order to deliver the consumable as directed by the central controller 120. The delivery schedule may be a temporary irrigating schedule that overrides the current irrigating schedule, e.g., activates the select zones until the consumable has been fully delivered, and then the regular irrigation schedule is activated. Alternatively, the delivery schedule may be integrated into a regular irrigation schedule.

The method 230 then proceeds to operation 238 and the consumable information and application information is applied to a growth and irrigation model for the irrigation area 114. For example, the nutrient characteristics, the applied volume, and the application time/date, can be used by the central controller 126 to better estimate the growth curve of the vegetation, which can be used to generate watering schedules. Because the specific and accurate information of the consumable information can be directly input by the system (as compared, for example, to user entered feedback), the information may be more accurate and sensitive. For example, a user may generally provide feedback regarding application of a fertilizer to his or her yard, whereas with the method 230, the central controller 126 will be able to know specific zones where the consumable was applied, the exact volume applied, as well as the vegetation characteristics at the time of application (e.g., size, moisture content, etc.). This information allows the central controller 126 to more accurately generate irrigation schedules that will maximize the benefits of the consumable. For example, the consumable information may be input to the growth and watering reducing scheduling as disclosed in U.S. patent application Ser. No. 16/528,070.

In some embodiments, the method 230 may also include generating an output to the user. For example, the central controller 126 may output a consumable delivery notification when the consumable has been expended to the user device 122, 124. This may be utilized by the home owner to order new consumables and/or by the service provider to plan for maintenance or the like.

Figure 5:
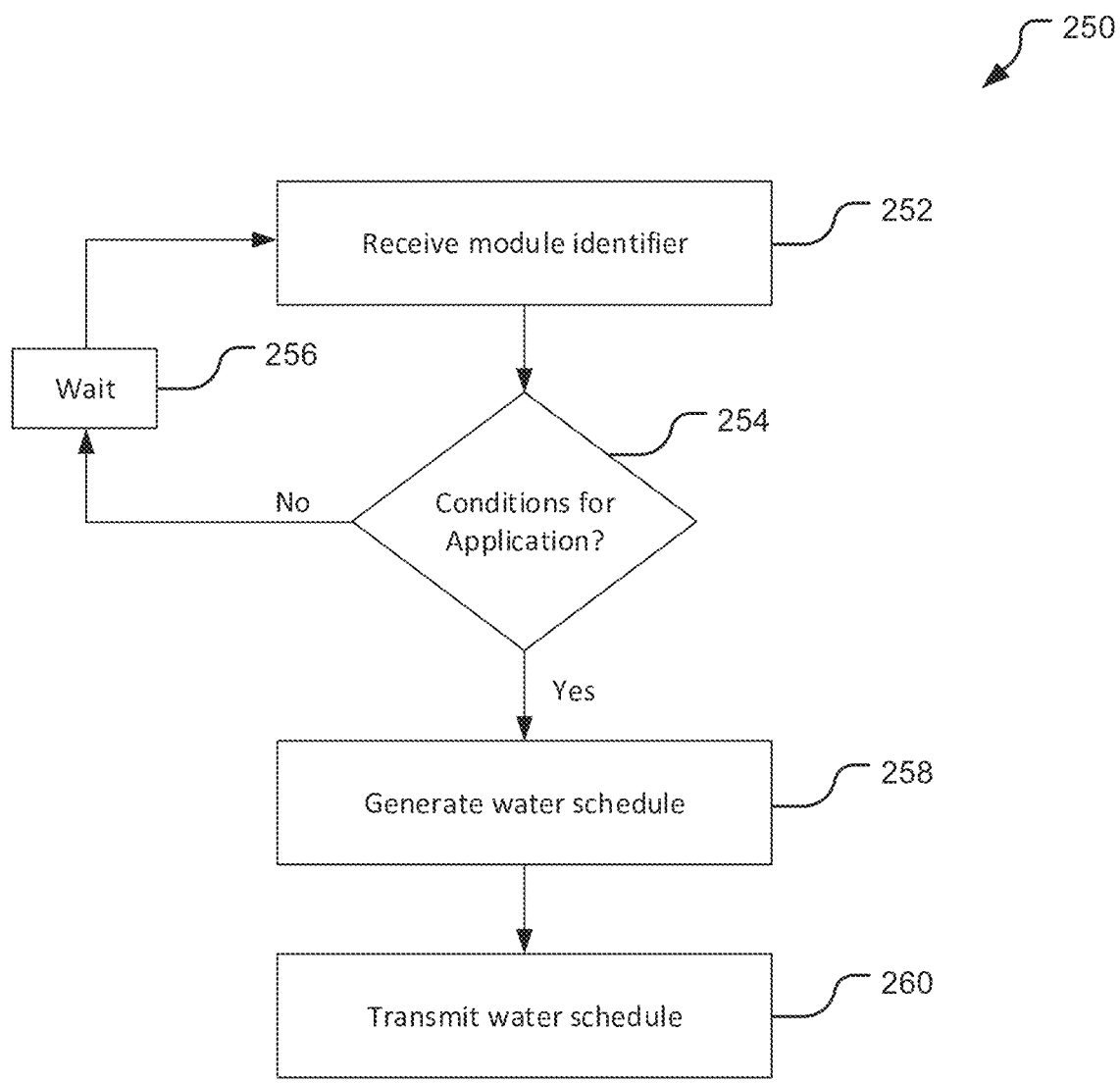
FIG. 5 is a flow chart illustrating a method of selectively activation application of consumables to an irrigation area.

FIG. 5 illustrates a method 250 for utilizing the irrigation system 100 to apply the consumables to the irrigation area 114. The method 250 begins with operation 252 and the area characteristics for the irrigation area 114 are determined. For example, the central controller 126 may receive information corresponding to a user account that includes information for the irrigation area 114, such as vegetation type, coverage, watering schedule, location, weather, growth curve, moisture content, sun exposure, and the like. The application characteristics may include user input information, image analysis information, database information, and/or any combination of sources.

Using the landscape area characteristics, the method 250 proceeds to operation 254 and the central controller 126 determines whether the conditions are appropriate for application of the consumable. For example, the central controller 126 may compare the current area conditions with optimal delivery conditions for the consumable to determine whether the conditions are appropriate for delivery. As one example, the consumable may be best delivered when temperature averages are above a certain level and the central controller 126 may use weather information corresponding to the area 114 to determine whether this condition has been satisfied. As another example, the central controller 126 may determine that the moisture content for the application area should be below 60% before application of the consumable. This will allow the consumable to soak into the ground, rather than run off. In these instances, the central controller 126 may estimate the moisture content based on vegetation and solid characteristics and known watering or weather events. In some examples, additional data (e.g., weather data) may be collected from external sensors associated with the irrigation system 100 and/or placed in or near the irrigation area, such as precipitation sensors. The central controller can also vary the regular irrigation schedule to reduce the watering times and volume to reach the optimal or desired moisture content threshold.

If the conditions for application are not ripe, the method 250 may proceed to operation 256 and wait before returning to operation 252. As another option, the central controller 126 may modify one or more current irrigation schedules to help expedite or condition the ground for application of the consumable.

Once the conditions satisfy the desired thresholds for application, the method 250 may proceed to operation 258 and the central controller 126 generates a watering schedule for delivery of the consumables. For example, depending on the zones that will receive the consumable, as well as the volume and type of consumable, the watering times and actuation order for the delivery outlets is selected, and then converted into a watering schedule. The watering schedule is then transmitted to the local controller 120 for execution.

As the local controller 120 executes the watering schedule, selected zones are activated (e.g., the valves are opened), and as water flows from the main water source 113, the water is directed into the consumable module 102 (e.g. via pressure differentials or actuated valves), the water mixes with the consumable, and the mixture is delivered by the delivery outlets (e.g., sprinkler heads) to the zones as activated. In this manner, by controlling the watering schedule, the controller 120 can control delivery volumes and location of the consumable. The precision of application and ease of application with the irrigation or fertigation system 100, allows better control and downstream effects (e.g., improved watering scheduling) then conventional fertilizing systems.

CONCLUSION

The methods and systems are described herein with reference to residential sprinkler systems However, these techniques are equally applicable to other types of irrigation systems and watering supply structures. As such, the discussion of any particular embodiment is meant as illustrative only. Further, features and modules from various embodiments may be substituted freely between other embodiments.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A method of delivering a consumable to an irrigation area comprising:
    determining application characteristics for applying the consumable to the irrigation area based on irrigation area characteristics of the irrigation area;
    analyzing consumable characteristics including one or more of a type, chemical makeup, volume contained within a nutrient module, application frequency, or targeted vegetation;
    generating an irrigation schedule for the irrigation area based on the consumable characteristics of the consumable within the nutrient module and the application characteristics of the irrigation area, wherein the consumable characteristics and the application characteristics together enhance the benefits of the consumable to the irrigation area, and the irrigation schedule is selected to apply an amount of the consumable and an amount of water to the irrigation area;
    transmitting the irrigation schedule to a local control to selectively activate one or more delivery outlets of a sprinkler system to deliver the consumable and the water from a water supply of the sprinkler system together to the irrigation area based on the irrigation schedule;
    generating a growth and irrigation model for the irrigation area based on the consumable characteristics, the applied amount of the consumable, vegetation characteristics of vegetation growing in the irrigation area, and the amount of the water applied to the irrigation area, wherein the growth and irrigation model estimates a growth curve for the vegetation growing in the irrigation area; and generating an updated irrigation schedule for the irrigation area based on the growth curve determined by the growth and irrigation model;

wherein:

during activation of the one or more delivery outlets of the sprinkler system, water flows passively from the water supply into the nutrient module to mix with the consumable to create a consumable water mixture that flows out of the nutrient module and to the one or more delivery outlets.

2. The method of claim 1, wherein the consumable is delivered to the irrigation area by the selective activation of the one or more delivery outlets to the irrigation area.

3. The method of claim 1, wherein the application characteristics are determined based on irrigation area characteristics of each of a plurality of zones of the irrigation area.

4. The method of claim 3, wherein the irrigation schedule includes instructions for applying the consumable to one or more zones of the plurality of zones of the irrigation area.

5. The method of claim 1, wherein the growth and irrigation model is generated based on vegetation type and growth stage of the irrigation area.

6. The method of claim 1, wherein the irrigation area characteristics of the irrigation area include a moisture content, vegetation type, and temperature.

7. The method of claim 1, wherein a velocity of the water increases as the water enters into the nutrient module due to a geometry of the nutrient module.

8. The method of claim 1, wherein the local control is configured to control a flow rate of the consumable water mixture to the one or more delivery outlets.

9. A system for application of nutrients to an area comprising:

a central controller configured to determine application characteristics for applying a consumable to an irrigation area based on irrigation area characteristics of the irrigation area and analyze consumable characteristics including one or more of a type, chemical makeup, volume contained within a nutrient module, application frequency, or targeted vegetation corresponding to the consumable and generate an irrigation schedule selected to apply an amount of the consumable and an amount of water to the irrigation area, the irrigation schedule based on the consumable characteristics of the consumable within the nutrient module and the application characteristics of the irrigation area, wherein the consumable characteristics and the application characteristics together enhance the benefits of the consumable to the irrigation area;

the nutrient module comprising an inlet and an outlet and is in fluid connection with a water supply of a sprinkler system and one or more delivery outlets of the sprinkler system, the nutrient module including the consumable, wherein the nutrient module is configured such that water from the water supply flows into the nutrient module to mix with the consumable within the nutrient module and a consumable water mixture exits the nutrient module;

a local controller in electronic communication with the central controller, the local controller configured to selectively activate the sprinkler system in accordance with the irrigation schedule to deliver the consumable water mixture from the nutrient module to the irrigation area via the one or more delivery outlets of the sprinkler system; and the central controller is configured to generate a growth and irrigation model for the irrigation area based on the consumable characteristics, the applied amount of the consumable, vegetation characteristics of vegetation growing in the irrigation area, and the amount of the water applied to the irrigation area, wherein the growth and irrigation model estimates a growth curve for the vegetation growing in the irrigation area, and the central controller is configured to generate an updated irrigation schedule for the irrigation area based on the growth curve determined by the growth and irrigation model.

10. The system of claim 9, wherein the central controller is configured to generate the irrigation schedule based on irrigation area characteristics of the irrigation area and consumable characteristics of the consumable.

11. The system of claim 9, wherein the local controller is configured to selectively activate the one or more delivery outlets of the sprinkler system to deliver the consumable to the irrigation area.

12. The system of claim 9, wherein the central controller is further configured to receive an identifier of the consumable in the nutrient module.

13. The system of claim 12, wherein the amount of the consumable is received with the identifier of the consumable.

14. The system of claim 9, wherein the central controller is further configured to generate a watering schedule for the irrigation area based on the amount of the consumable delivered to the irrigation area in accordance with the irrigation schedule.

15. One or more non-transitory computer readable media encoded with instructions which, when executed by one or more processors of a central controller, cause the central controller to perform operations comprising:

determining application characteristics for applying a consumable to an irrigation area based on irrigation characteristics of the irrigation area;

analyzing consumable characteristics including one or more of a type, chemical makeup, volume contained within a nutrient module, application frequency, or targeted vegetation;

generating an irrigation schedule for the irrigation area based on the consumable characteristics of the consumable within the nutrient module and the application characteristics of the irrigation area, wherein the consumable characteristics and the application characteristics together enhance the benefits of the consumable to the irrigation area, and the irrigation schedule is selected to apply an amount of the consumable and an amount of water to the irrigation area;

transmitting the irrigation schedule to a local control to selectively activate one or more delivery outlets of a sprinkler system to deliver the consumable and the water from a water supply of the sprinkler system together to the irrigation area based on the irrigation schedule;

generating a growth and irrigation model for the irrigation area based on the consumable characteristics, the applied amount of the consumable, vegetation characteristics of vegetation growing in the irrigation area, and the amount of the water applied to the irrigation area, wherein the growth and irrigation model estimates a growth curve for the vegetation growing in the irrigation area; and generating an updated irrigation schedule for the irrigation area based on the growth curve determined by the growth and irrigation model;

wherein:
    during activation of the one or more delivery outlets of the sprinkler system, water flows passively from the water supply into the nutrient module to mix with the consumable to create a consumable water mixture that flows out of the nutrient module and to the one or more delivery outlets.

16. The computer readable media of claim 15, wherein the instructions cause the central controller to determine the application characteristics based on irrigation area characteristics of each of a plurality of zones of the irrigation area.

17. The computer readable media of claim 16, wherein the irrigation schedule includes instructions for applying the consumable to one or more zones of the plurality of zones of the irrigation area.

18. The computer readable media of claim 15, wherein the irrigation area characteristics of the irrigation area include a moisture content, vegetation type, and temperature.

19. The computer readable media of claim 15, wherein a velocity of the water increases as the water enters into the nutrient module due to a geometry of the nutrient module.

20. The computer readable media of claim 15, wherein the local control is configured to control a flow rate of the consumable water mixture to the one or more delivery outlets.

* * * * *